US011081913B2

(12) United States Patent
Calley

(10) Patent No.: US 11,081,913 B2
(45) Date of Patent: *Aug. 3, 2021

(54) METAL RIBBON STATOR AND MOTOR COMPRISING SAME

(71) Applicant: Moog Inc., East Aurora, NY (US)

(72) Inventor: David Calley, Flagstaff, AZ (US)

(73) Assignee: Moog Inc., East Aurora, NY (US)

( * ) Notice: Subject to any disclaimer, the term of this patent is extended or adjusted under 35 U.S.C. 154(b) by 7 days.

This patent is subject to a terminal disclaimer.

(21) Appl. No.: 16/392,208

(22) Filed: Apr. 23, 2019

(65) Prior Publication Data

US 2019/0252928 A1 Aug. 15, 2019

Related U.S. Application Data

(63) Continuation of application No. 15/365,181, filed on Nov. 30, 2016, now Pat. No. 10,320,246, which is a continuation of application No. 14/758,887, filed as application No. PCT/US2014/000004 on Jan. 6, 2014, now Pat. No. 9,680,339.

(60) Provisional application No. 61/848,457, filed on Jan. 4, 2013.

(51) Int. Cl.
| | |
|---|---|
| *H02K 1/14* | (2006.01) |
| *H02K 1/18* | (2006.01) |
| *H02K 16/02* | (2006.01) |
| *H02K 21/24* | (2006.01) |

(52) U.S. Cl.
CPC .............. *H02K 1/14* (2013.01); *H02K 1/145* (2013.01); *H02K 1/182* (2013.01); *H02K 16/02* (2013.01); *H02K 21/24* (2013.01); *H02K 2201/12* (2013.01)

(58) Field of Classification Search
CPC ............ H02K 1/02; H02K 1/06; H02K 37/02; H02K 41/025
See application file for complete search history.

(56) References Cited

U.S. PATENT DOCUMENTS

| | | |
|---|---|---|
| 3,213,302 A | 10/1965 | Barney |
| 3,495,114 A | 2/1970 | Kazansky |
| 4,227,108 A | 10/1980 | Washizu et al. |
| (Continued) | | |

FOREIGN PATENT DOCUMENTS

| | | |
|---|---|---|
| EP | 763880 A1 | 3/1997 |
| EP | 1804365 A2 | 7/2007 |
| (Continued) | | |

OTHER PUBLICATIONS

Extended European Search Report dated Aug. 23, 2016 in European Application No. 14735138.1.

(Continued)

*Primary Examiner* — Tran N Nguyen
(74) *Attorney, Agent, or Firm* — Harter Secrest & Emery LLP

(57) ABSTRACT

A stator made from a ribbon of metal having multiple layers of slit metal, and motors made therefrom are described. A ribbon having multiple layers of metal is formed into a stator such as by flattening or pleating the ribbon to form each pole of a stator having a plurality of stator teeth, or poles. The stator formed from the metal ribbon may be configured into any suitable type of motor, such as an axial transverse flu motor. A magnetic flu return may also be made out of metal ribbon.

17 Claims, 17 Drawing Sheets

(56) References Cited

U.S. PATENT DOCUMENTS

| | | |
|---|---|---|
| 4,249,099 A | 2/1981 | Bhongbhibhat |
| 4,546,282 A | 10/1985 | Hartwig |
| 5,051,637 A | 9/1991 | Harris |
| 5,731,649 A | 3/1998 | Caamano |
| 5,886,449 A | 3/1999 | Mitcham |
| 6,462,456 B1 | 10/2002 | Cecristofaro |
| 6,664,704 B2 | 12/2003 | Calley |
| 6,882,066 B2 | 4/2005 | Kastinger |
| 6,924,579 B2 | 8/2005 | Calley |
| 7,034,425 B2 | 4/2006 | Detela |
| 7,332,846 B2 | 2/2008 | Hill |
| 7,375,760 B2 | 5/2008 | Kempf et al. |
| 7,608,969 B2 | 10/2009 | Suzuki et al. |
| 7,800,275 B2 | 9/2010 | Calley et al. |
| 7,851,965 B2 | 12/2010 | Calley et al. |
| 7,863,797 B2 | 1/2011 | Calley et al. |
| 7,868,508 B2 | 1/2011 | Calley et al. |
| 7,868,511 B2 | 1/2011 | Calley et al. |
| 7,876,019 B2 | 1/2011 | Calley et al. |
| 7,923,886 B2 | 4/2011 | Calley et al. |
| 7,952,252 B2 | 5/2011 | Kang et al. |
| 7,973,446 B2 | 7/2011 | Calley et al. |
| 7,989,084 B2 | 8/2011 | Janecek |
| 7,994,678 B2 | 8/2011 | Calley et al. |
| 8,008,821 B2 | 8/2011 | Calley et al. |
| 8,030,819 B2 | 10/2011 | Calley et al. |
| 8,053,944 B2 | 11/2011 | Calley et al. |
| 8,193,679 B2 | 6/2012 | Calley et al. |
| 8,242,658 B2 | 8/2012 | Calley et al. |
| 8,253,299 B1 | 8/2012 | Rittenhouse |
| 8,415,848 B2 | 4/2013 | Calley et al. |
| 9,197,103 B2 | 11/2015 | Taniguchi |
| 9,680,339 B2 | 6/2017 | Calley |
| 10,320,246 B2 * | 6/2019 | Calley .................. H02K 1/182 |
| 2007/0152528 A1 | 7/2007 | Kang et al. |
| 2008/0272666 A1 | 11/2008 | Halstead |
| 2009/0322165 A1 | 12/2009 | Rittenhouse |
| 2011/0148225 A1 | 6/2011 | Calley et al. |

FOREIGN PATENT DOCUMENTS

| | | |
|---|---|---|
| FR | 1431324 A | 3/1966 |
| JP | S5-9011743 A | 1/1984 |
| JP | 2001186743 A | 7/2001 |
| JP | 2001292542 A | 10/2001 |
| JP | 2002374642 A | 12/2002 |
| JP | 2003125568 A | 4/2003 |
| JP | 2007185087 A | 7/2007 |
| JP | 2011109809 A | 6/2011 |
| JP | 2012023861 A | 2/2012 |
| WO | WO199948187 A1 | 9/1999 |

OTHER PUBLICATIONS

International Search Report and Written Opinion dated May 9, 2014 in Application No. PCT/US2014/000004.
International Preliminary Report on Patentability dated Jul. 7, 2015 in Application No. PCT/US2014/000004.
Formality Examination Report received Aug. 6, 2015 in Saudi Arabia Application No. 515360720.
First Examination Report received Apr. 17, 2016 in Saudi Arabia Application No. 515360720.
Second Examination Report received Jul. 21, 2016 in Saudi Arabia Application No. 515360720.
Notice of Allowance dated Jul. 5, 2016 in U.S. Appl. No. 14/758,887.
Office Action dated Mar. 14, 2016 in U.S. Appl. No. 14/758,887.
First Examination Report received May 2, 2019 in Indian Application No. 2171/MUMNP/2015.
Japanese Patent Office, Office Action from corresponding JP Patent Application No. 2019-006049, dated Aug. 18, 2020.
Japanese Patent Office, Office Action from corresponding JP Patent Application No. 2019-006049, dated Feb. 4, 2020.

* cited by examiner

FIG. 21

METAL RIBBON STATOR AND MOTOR COMPRISING SAME

CROSS REFERENCE TO RELATED APPLICATIONS

This application is a continuation of, and claims the benefit of and priority to, U.S. Ser. No. 14/758,887, entitled Metal Ribbon Stator and Motor Comprising Same, filed on Jul. 1, 2015 and currently pending, which is a U.S. national phase filing under 35 U.S.C. § 371 of, and claims the benefit of and priority to, PCT Application No. PCT/US2014/000004, entitled Metal Ribbon Stator and Motor Comprising Same and filed on Jan. 6, 2014, which claims the benefit of U.S. Provisional Patent Application No. 61/848,457, entitled Ribbon Stator and Motor Comprising Same and filed on Jan. 4, 2013. The entirety of all of the three foregoing applications are incorporated by reference herein.

BACKGROUND OF THE INVENTION

Field of the Invention

The present invention relates to stators for electric motors, and in particular stators comprising a multilayer amorphous ribbon.

Background

The present invention is an axial transverse flux motor providing high torque density, low cost construction and providing for high RPM operation by allowing for use of materials that do not require stamping for assembly. The design uses non-oriented and flux conduction material in a "ribbon" or "tape," typically formed by slitting. For lower RPM operation, silicon steel works well. For higher RPM operation, amorphous metal is a good material of choice in that it has high permeability and low loss at both low and high frequency applications. Amorphous metal, such as Metglas available from Metglas Inc., Conway, SC or AT & M, Beijing, China, or nanocrystalline materials are very difficult to machine or form into shapes suitable for stator configurations.

There exists a need for a motor/generator stator made from material allowing for a range of non-oriented slit materials including silicon steel, amorphous metal, and nanocrystalline materials that is also simple to assemble, high in torque density, allows Ku tight tolerances, and requires very few parts, thereby reducing assembly cost and the potential for parts being incorrectly assembled or positioned. There exists a need for a motor that has low loss at low and high rotational frequency, and especially motors with high pole counts, such as transverse flux motors.

SUMMARY OF THE INVENTION

This invention relates to an axial transverse flux motor/generator hereafter here after referred to as an AFTM motor. The pole pieces of the armature/stator of the motor are principally made from a ribbon or tape of slit magnetically conductive materials hereafter referred to as a tape. The tape is formed of layers of suitable magnetically conductive material such as silicon steel, amorphous metal, and nanocrystalline material.

The tape is formed of multiple layers of material, typically by winding into a toroid. In a first configuration, toroids are then flattened into bars fanning as pole pieces with at least one end remaining uncut to allow flux to travel around the end interacting with the magnet ring. In another configuration, two or more poles may be formed from one toroid. These may be formed by folding or "pleating" to form the plurality of armature teeth.

The tape has a top surface and a bottom surface, a first edge and a second edge. The tape formed pole or pole set may be positioned with the poles adjacent a rotor with the metal tape edge facing the magnet ring. The magnet ring shown here is formed of an assembly of magnets with flux concentrators placed between them. They may be rotating or stationary; however, for ease of discussion, will be referred to hereafter as the rotor. The flux that has entered the edges of the pole or pole set travels substantially along the layers without crossing layers to a return part. The return part may also be formed of a toroid in tape or another material such as SMC. The flux then passes substantially axially to the paired pole or pole set surrounding the coil. The flux travels again through the edge of the pole or pole set substantially in plane to the rotor.

The pole or pole sets formed of tape may be formed such that a gap is left so that flux will have a greater tendency to stay in the planes of the tape. The individual layers of the ribbon may be adhered in discrete locations, such as by the application of a discrete amount of adhesive between two ribbon layers. In another embodiment, a discontinuous adhesive may be applied to one or more surfaces of a ribbon layer during the formation of the ribbon loop or tape. An adhesive may be a magnetic flux insulator or magnetic flux conductor and may provide a small gap between ribbon layers. In still another embodiment, a magnetic insulator may be configured between two or more of the formed stator teeth.

The poles or pole sets or otherwise formed tape may be positioned around at least a portion of a rotor as a stator stack. A stator stack may extend around any suitable portion of the rotor including, but not limited to, 30 electrical degrees or more, 50 electrical degrees or more, 120 electrical degrees or more, 180 electrical degrees or more, 360 electrical degrees or more and any range between and including the values provided. In an exemplary embodiment, a motor comprises three stator halves configured for approximately 120 electrical degrees on each side of the rotor forming 3 phases in a plane.

An electric motor as described herein may comprise a rotor configured between a first stator half and a second stator half. The rotor may be any suitable type of rotor including, but not limited to, a permanent magnet (PM) rotor, an alternating field rotor, a PM flux concentrator type rotor, a wound field rotor, an induction rotor, and a low loss PM flux concentrating type rotor.

A stator can he made using a tape, as described herein, in a very cost-effective and efficient manner. Slitting materials provides for very high tolerances and when a slit material is formed into a tape that is used to form a stator, the adherence to tight tolerances is greatly simplified. In addition, slitting magnetically conducting materials, such as amorphous metal, is cost effective, as it requires no additional tooling to stamp, does not remove and waste the material and allows for high tolerances. Amorphous metals and other low magnetic loss materials are expensive and slitting to form a ribbon provides for extremely high utilization of the material. Furthermore, a stator can be made with only three components: a first stator half, a second stator half and a return. Since all three of these components can be made from high precision slit materials, the tolerances of the assembly can be held to very high levels. A tape formed of a plurality of ribbons provides for high mechanical strength in the axial direction. The tape may be easily formed, bent, folded, pleated and shaped in the radial direction but is extremely stiff in the axial direction. Therefore, stator teeth can be easily formed without compromising the strength of the stator in the axial direction.

A stator tooth may comprise shaped tape, as described herein, and the tape may be pressed into a single pole piece or folded to form a number of pole pieces to any suitable degree, such as 180 degrees, or completely back upon itself, or any other suitable degree. As mentioned above, a gap may be left so the fold is not closed and flux passing between planes may be reduced. In some embodiments, a tape is folded back upon itself and the inside surfaces touch and/or are adhered together.

The summary of the invention is provided as a general introduction to some of the embodiments of the invention, and is not intended to be limiting. It is to be understood that various features and configurations of features described in the Summary may be combined in any suitable way to form any number of embodiments of the invention. Some additional example embodiments, including variations and alternative configurations of the invention, are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

FIG. 21 shows data used to produce the graph shown in FIG. 20.

Figure 1:
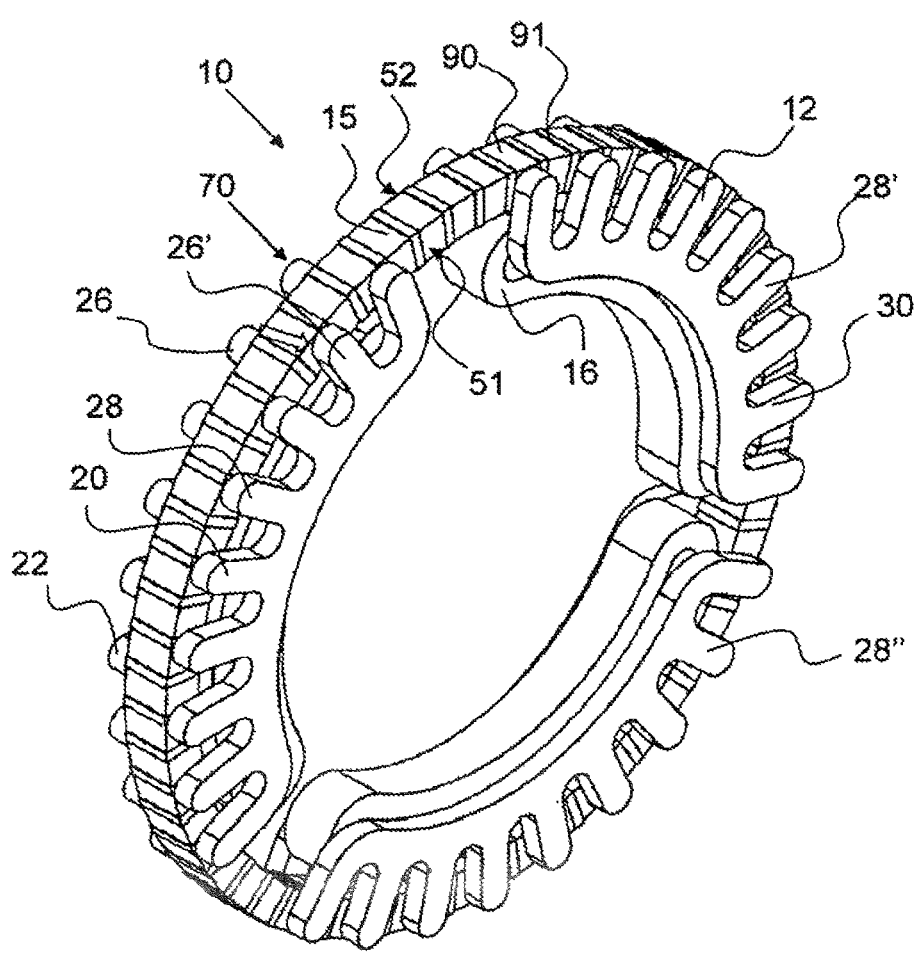
FIG. 1 shows an isometric view of a portion of a simplified exemplary in-plane three-phase axial transverse flux motor having tape stator halves configured on either side of a rotor.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, and some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, and improvements are within the scope of the present invention.

FIG. 1 shows an isometric view of a portion of an exemplary simplified in-plane three-phase transverse flux motor 70 having stator 12 halves configured on either side of a rotor 15. The stator comprises a first set of stator stacks 28-28" configured on a first side 51 of the rotor 15 and a second set of stator stacks configured on a second side 52 of the rotor. The tape 30 is shown formed into a stator 12 having a plurality of teeth 26. A return 18 (not shown) is configured inside the coil 16 and magnetically couples a first stator half 20 on a first side 51 of the rotor with a second stator half 22 on the second side 52 of the rotor. This stator has a tooth removed from each phase side to provide for wire area. The rotor comprises an assembly of magnets 90 and flux concentrators 91.

Figure 2:
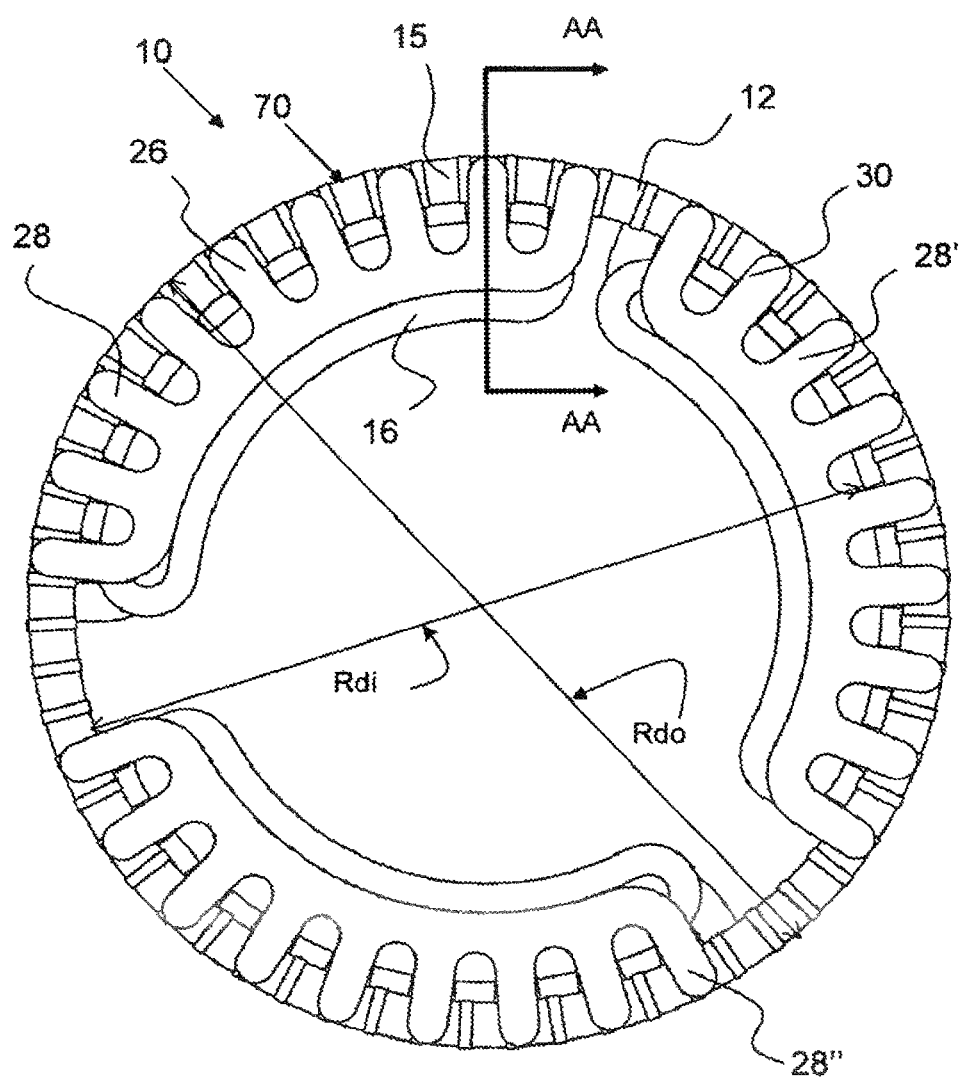
FIG. 2 shows a side view of the exemplary simplified axial transverse flux motor shown in FIG. 1.

FIG. 2 shows a side view of the motor 10 shown in FIG. 1. Three stator stacks 28-28" are configured on either side of the rotor 15 to conduct flux from the rotor through a first stator half 20, through the return and to a second stator half 22 on an opposing side of the rotor. The return coil is configured to extend between a first stator half and a second stator half. The return coil is configured on the inside diameter of the rotor Rdi as shown in FIGS. 1 and 2; however, a return and coil could be configured on the outside diameter Rdo of the rotor. The rotor shown in FIGS. 1 and 2 is a ring having an inside and outside diameter, Rdi, Rdo, respectively, as shown. Again, the figure shows a tooth from each phase half removed to accommodate wire.

Figure 3:
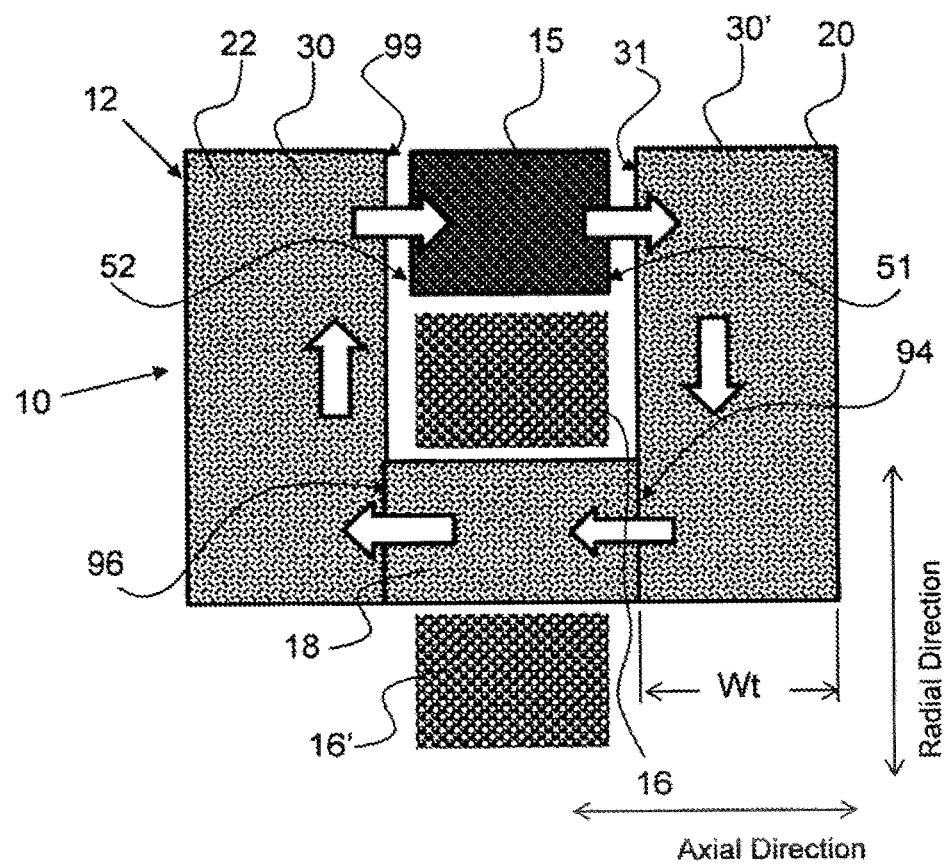
FIG. 3 shows a cross-sectional view of the exemplary axial transverse flux motor shown in FIG. 2.

FIG. 3 shows a cross-sectional view taken along line AA of the exemplary transverse flux motor 10 shown in FIG. 2. The cross-section shows a first stator half 20 configured adjacent the first side 51 of the rotor 15 and a second stator half 22 configured adjacent the second side 52 of the rotor 15. The return 18 is shown configured on the inside diameter of the rotor 15 and within the coil 16. The coil is looped around the return as depicted by the two sections of the coil 16, 16' in FIG. 3. The return is depicted as a tape in FIG. 3, but could be any suitable magnetic flux conducting material. The stator magnetic portion as shown in FIG. 3 consists of tape, whereby the first stator half, second stator half and the return all consist of tape, as described herein. In some embodiments, one or more of the stator halves may be attached to the return such as by being pressed together or through the use of an adhesive. As shown in FIG. 3, both the first and second stator halves 20, 22 are attached to the return 18. The width Wt of the stator half or tape is shown in FIG. 3. The control of tolerances may be more easily controlled by a slit ribbon that is configured as a stator as opposed to a plurality of parts that require assembly to form a stator and where "tolerance stack-up" occurs. In addition, the tape may be flexible along the length of the ribbon but has considerable strength and is rigid in a plane perpendicular to the tape length, or the axial direction.

As shown in FIG. 3, the flux alternates through the coil 16. It passes from the rotor 15, through ribbon edge 31, through the first stator half 20, out of the first stator half edge 31 and into the return 18 first edge 94, out the second ribbon edge 96, into the second stator half edge 99, into the second stator half 22, and finally back to the rotor 15 through the second stator half edge 99. The flux in this embodiment flows substantially along the plane of the ribbons and does not require flux to flow through the planes or from plane to plane. Again, the magnetic loop may be configured on the outside of the rotor versus the inside of the rotor as shown in FIG. 3.

Figure 4A:
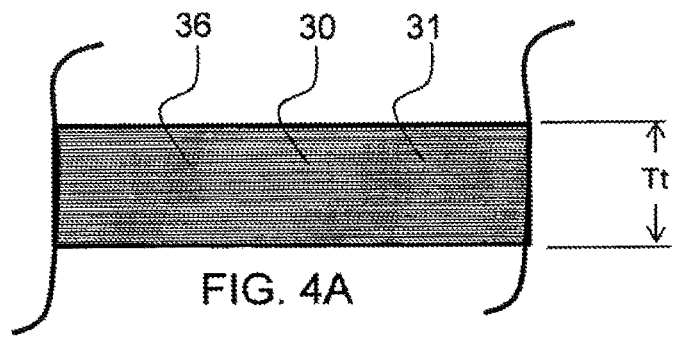
FIG. 4A shows a side view of an exemplary tape having a plurality of ribbon layers.
Figure 4B:
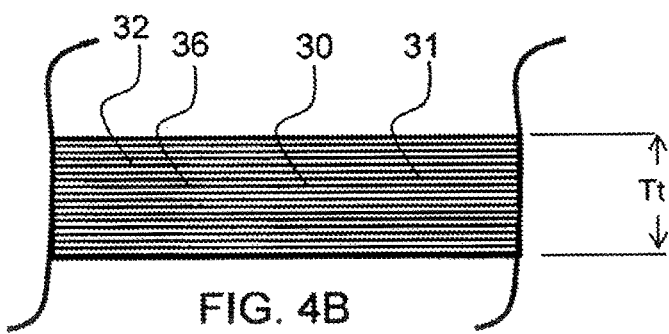
FIG. 4B shows a side view of an exemplary tape having a plurality of ribbon layers and a space between ribbon layers.
Figure 5:
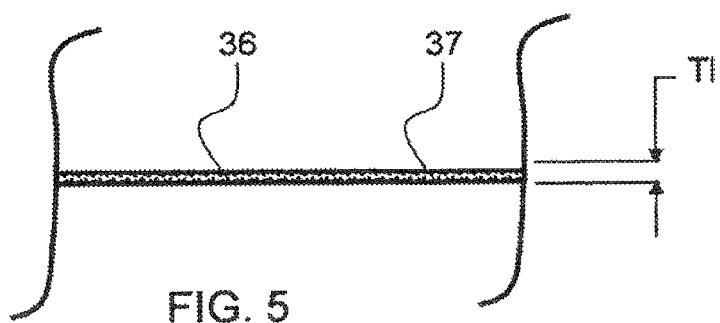
FIG. 5 shows a side view of an exemplary ribbon.

As shown in FIG. 4A, an exemplary tape 30 comprises a plurality of ribbon layers 36. The edges of the individual ribbon layers make up the tape edge 31. As shown in FIG. 4B, an exemplary tape 30 comprises a spacer 32 between the plurality of ribbon layers 36. This may be air as from spacing or packing factor, or spacer may be magnetically conductive or a non-magnetically conductive material such as an adhesive applied in discrete locations on the tape, such as between ribbon layers or to the outer and/or inner layer of the ribbon. The thickness Tt of the tape 30 is shown in FIGS. 4A and 4B and may be any suitable thickness as described herein. A single ribbon 36 is shown in FIG. 5 with the single ribbon edge 37. The thickness T1 of single ribbon layer 36 is shown in FIG. 5 and may be very thin as described herein.

Figure 6:
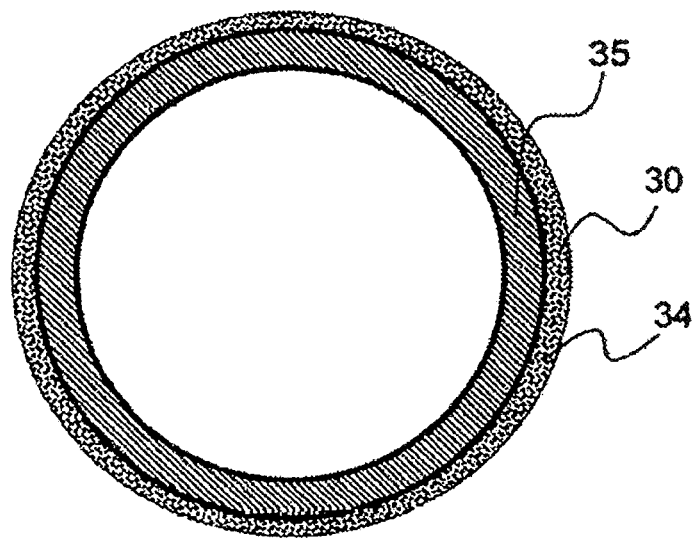
FIG. 6 shows a side view of an exemplary tape loop configured on a core.
Figure 7A:
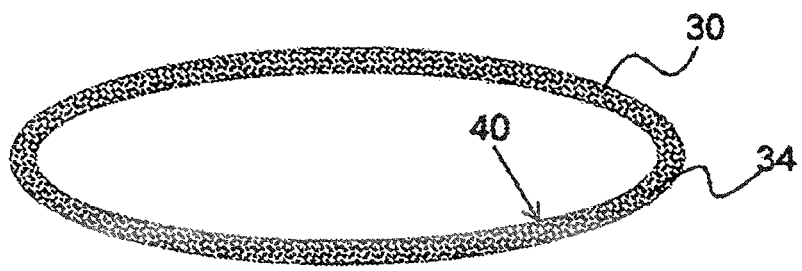
FIG. 7A shows a side view of an exemplary tape loop.

As shown in FIG. 6, an exemplary tape 30 or tape loop 34 is configured on a core 35. As described, a thin layer of magnetically conductive material may be slit and taken-up on a core. The leading and or trailing end of the ribbon may be adhered to secure the ribbon layer to the loop. As shown in FIG. 7A, an exemplary tape loop 34 has been removed from the core 35 and may be flexible and bend easily along the length of the loop, or about the circumference of the loop. The tape loop 34 shown in FIG. 7A may be compressed to the point that the inside surfaces of the tape loop contact each other and the compressed tape loop takes on the shape of a length of tape.

Figure 7B:
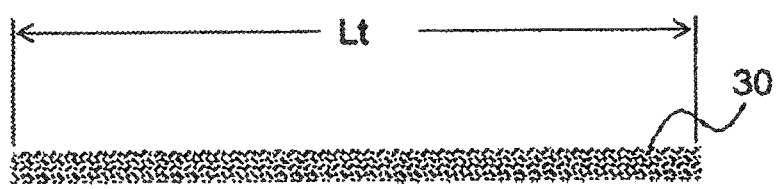
FIG. 7B shows a side view of an exemplary tape loop compressed.

As shown in FIG. 713, a tape loop 34 may be slit or a plurality of ribbon layers may be stacked to form a tape 30 as shown in FIG. 7B. The length of a tape may be any suitable length Lt, as shown in FIG. 7B. The tape 30 shown in FIG. 7A is a tape loop, whereas the tape 30 shown in FIG. 7B is a discrete tape, having a length between a first and a second end.

Figure 8:
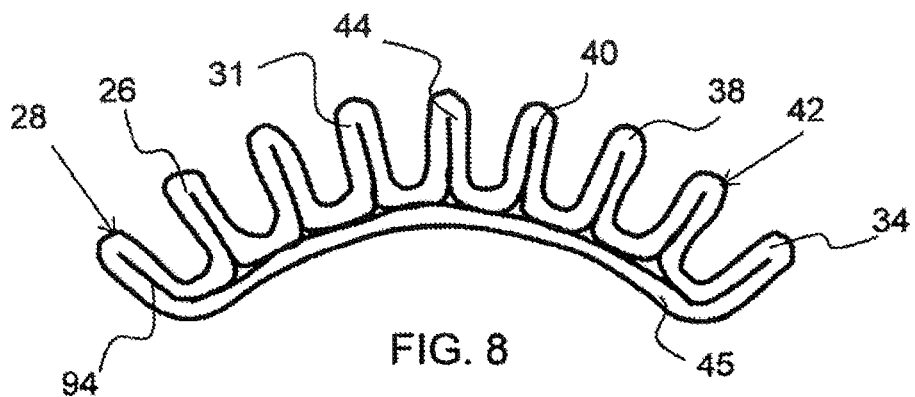
FIG. 8 shows a side view of an exemplary simplified tape formed into a stator having a plurality of stator teeth formed from the tape.
Figure 9:
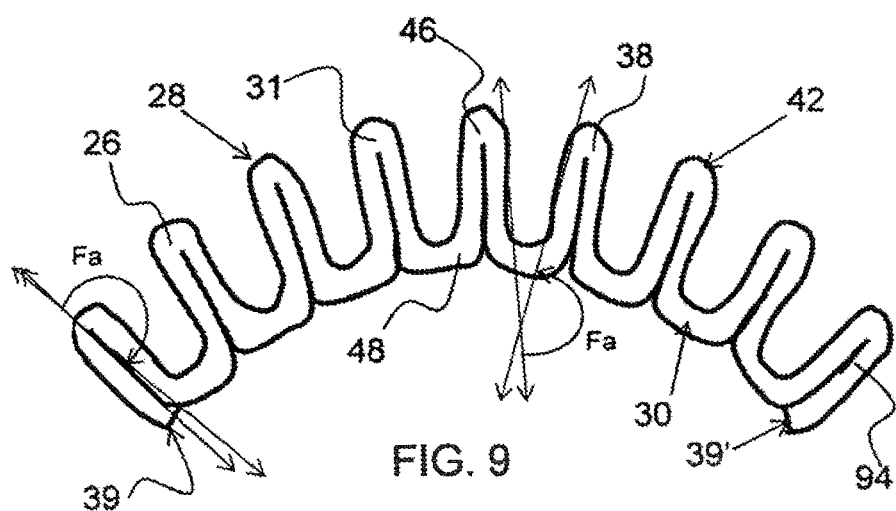
FIG. 9 shows a side view of an exemplary tape formed into a stator having a plurality of stator teeth formed from the pleated tape.

As shown in FIG. 8, an exemplary tape loop 34 is formed into a stator stack 28 having a plurality of stator teeth 26 formed from pleated tape. The tape pleat 38 shown in FIG. 8 comprises portions of the tape folded together with the inside tape loop 34 surface 40 contacting along the inside of the fold. The inside surface 40 does not, however, have to make contact to form a pleat or tooth. The tape loop 34 shown in FIG. 8 comprises a first portion 44 of the tape configured as pleats, or stator teeth 26, and the remaining portion of the tape loop, or second portion 45 configured between a first end and a second end of the pleated portion of the tape. In another embodiment, a tape 30 is formed into pleats 38, or teeth with no second portion between the first and second end of the pleated tape as shown in FIG. 9. It is to be understood that a compressed tape loop may be formed into a stator half as shown in FIG. 9 with the entire tape loop pleated, thereby not having a second portion of the tape loop connecting the first and second end of the pleated portion; the entire tape loop would be formed as one piece.

As shown in FIG. 9, an exemplary tape 30 is formed into a stator 28 having a plurality of stator teeth 26 formed from a discrete tape 30. A tape loop may be cut to form a discrete tape as shown in FIG. 9. The tape ends 39 of the tape shown in FIG. 9 are not in an area that will affect the tolerances. The tape ends may be adhered to the formed tape. The stator 28 comprises a tooth fold 46 and a return fold 48 and may be folded to any suitable fold angle, Fa.

Figure 10:
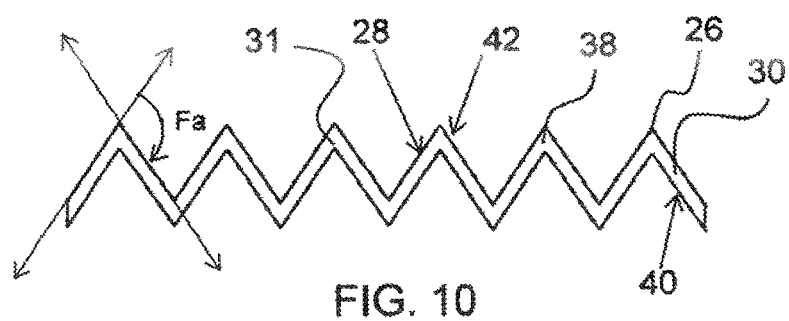
FIG. 10 shows a side view of an exemplary tape formed into a stator having a plurality of stator teeth formed from the pleated tape.

A fold angle Fa is the angle measured from a line extending substantially parallel with a surface on one side of a fold, to a line extending substantially parallel with the same surface of the tape on the opposing side of a fold as shown in FIG. 9 and FIG. 10. The rotor folds 46 shown in FIG. 9 would have a fold angle of substantially 180 degrees since the inside surface of the tape touches along the rotor fold.

As shown in FIG. 10, an exemplary tape 30 is formed into a stator stack 28 having a plurality of stator teeth 26 formed from pleated tape. The stator stack 28 shown in FIG. 10 is formed from a discrete length of tape 30 and the inside surface does not contact along the inside of the pleats. This type of pleat may be referred to as a saw tooth type pleat. The fold angle Fa of this type of pleat is less than the fold angle of the rotor folds shown in FIG. 9. A sinusoidal pleat having a sinusoidal shape may also be employed in the formation of a stator stack. Each of the teeth shown in FIG. 9 comprises a gap within the pleat of the tooth. This gap may reduce losses.

Figure 11:
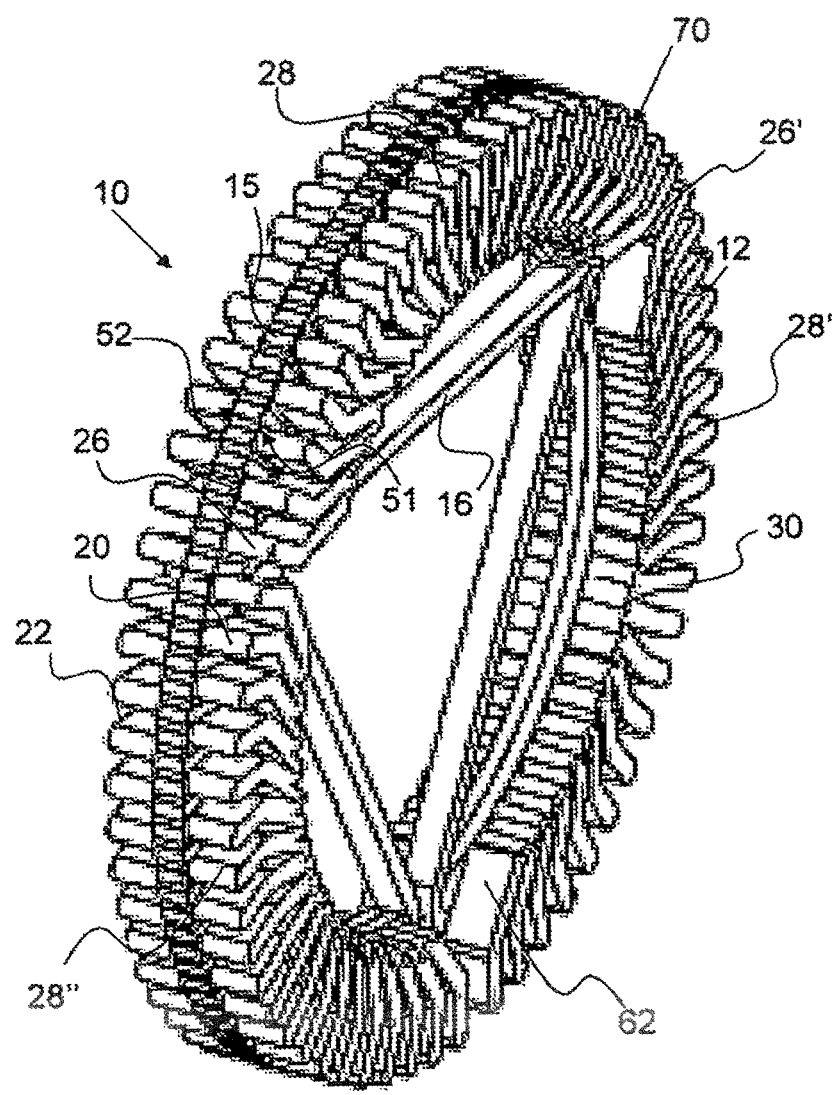
FIG. 11 shows an isometric view of a portion of an exemplary transverse flux motor having stator halves formed from tape and configured on either side of a rotor and showing angled teeth to allow for wire exits without loss of flux and shortened copper loop shape.

As shown in FIG. 11, a portion of an exemplary in-plane three-phase 70 transverse flux motor 10 comprises stator halves of formed tape configured on either side of a rotor 15. FIG. 11 shows angling of the inner portion of the teeth such that clearance for the wire may be provided for without reducing teeth or flux area. The motor is an in-plane three-phase motor type 70 having three stators 28, 28', 28" on both the first rotor side 51 and the second rotor side 52. These stators may be identical or not depending on design and manufacturing requirements. Each stator magnetic portion comprises a first stator half 20, a second stator half 22 and a return (not clearly shown). The coil 16 in this embodiment is configured around the return and between the first stator tooth 26, or first pole of that phase, and the last stator tooth 26," or last pole of the phase, and does not follow the contour of the rotor as shown in FIG. 1. In addition, the stator halves are configured with coil entry ends 62, whereby the coil may enter without the loss of a stator tooth or active pole. The rotor and/or return folds at the coil entry end 62 may be different from the rotor and/or return folds throughout the rest of the stator half, and may be different by any suitable degree including more than about 10 degrees, more than about 30 degrees, more than about 45 degrees, more than about 60 degrees, more than about 90 degrees and any suitable range between and including the values provided.

Figure 12:
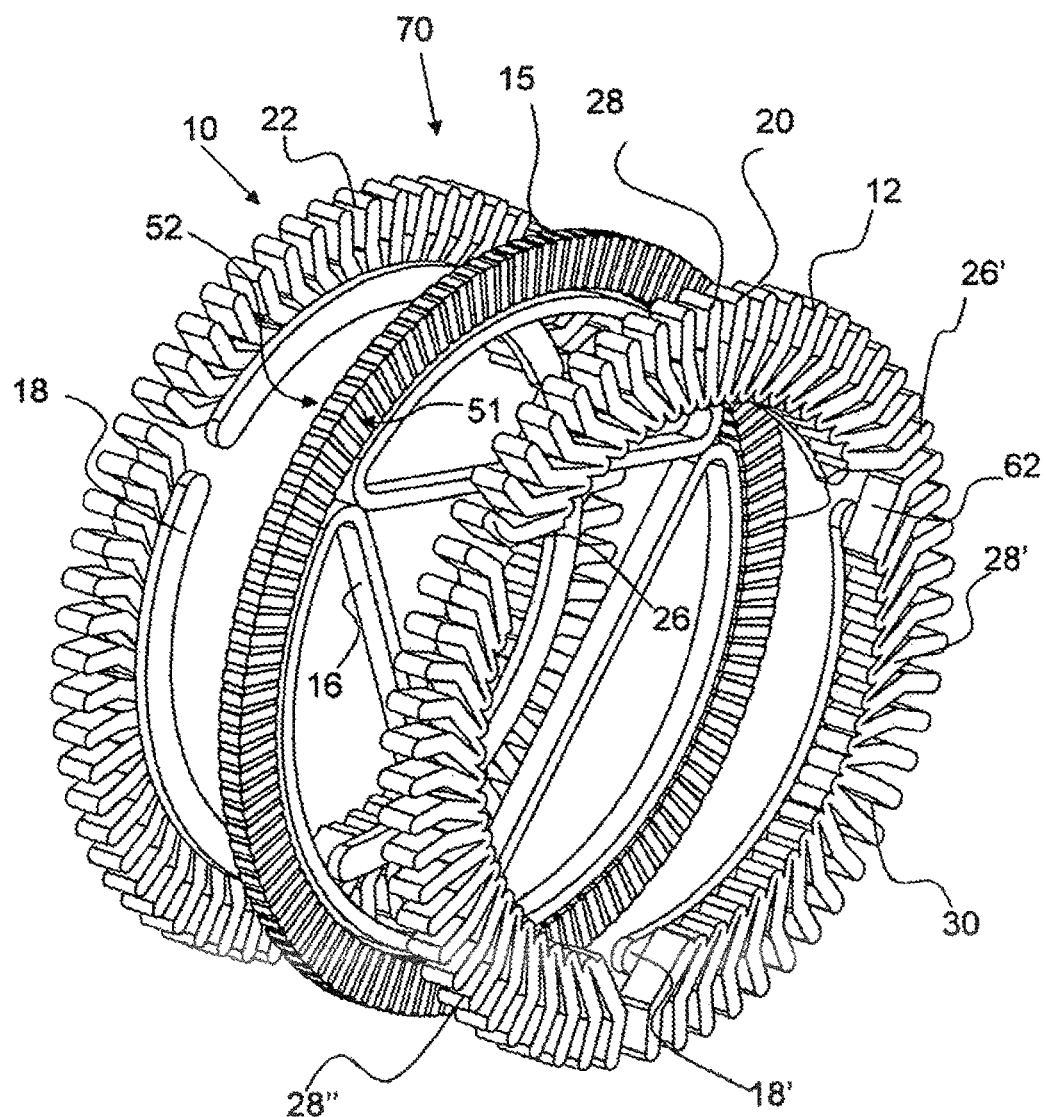
FIG. 12 shows an isometric exploded view of a portion of an exemplary in-plane three-phase transverse flux motor having stator halves formed from tape and configured on either side of a rotor with angled stator teeth portions and shortened coil path.

FIG. 12 shows the exemplary in-plane three-phase transverse flux motor 70 shown in FIG. 11, in an exploded view, whereby each of the components of the stator magnetic portion are shown, including the first stator half 20, return 18 and second stator half 22. A return may comprise one or more portions such as 18 and 18' as shown in FIG. 12 or combining 18 and 18' into one part. The coil entry ends 26 are more clearly shown in FIG. 12 as well.

Figure 13:
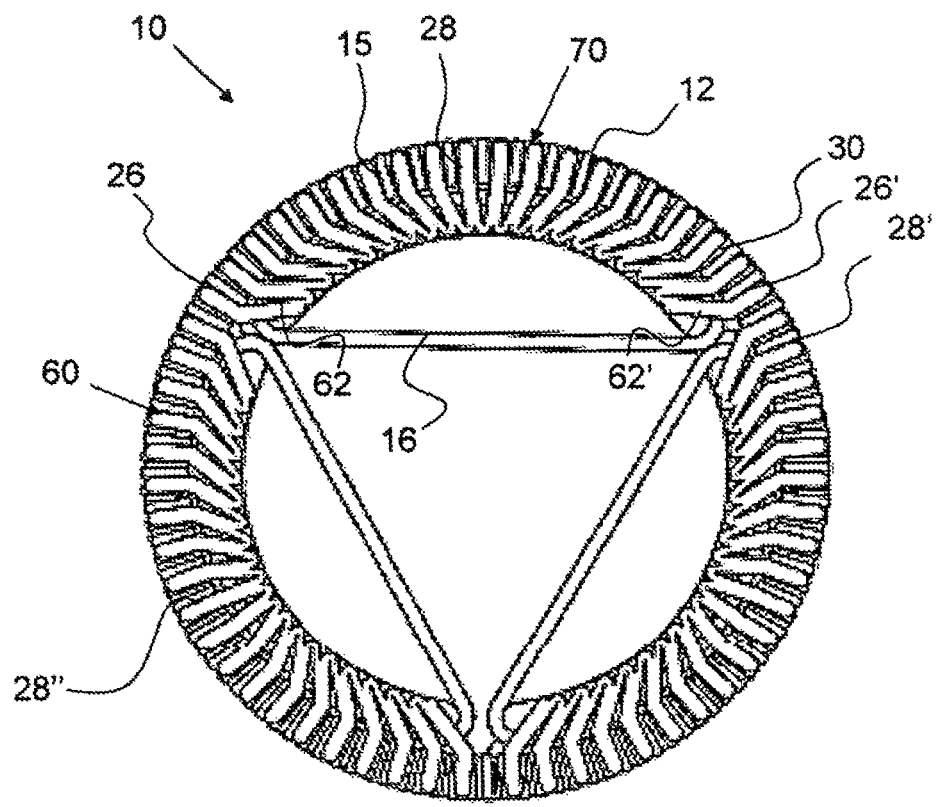
FIG. 13 shows a side view of a portion of an exemplary asymmetric transverse flux motor having three stator halves formed from tape and coil entry ends.

FIG. 13 shows a side view of the exemplary in-plane three-phase transverse flux motor 70 shown in FIG. 11. As shown in FIG. 13, the exemplary transverse flux motor 10 comprises three stators, 28-28" formed from tape. Note the stator teeth are slightly offset to the poles or rotor switching surfaces to reduce cogging and noise. This is an asymmetric stator 60 configuration as described herein. The stator is configured as if there are 121 poles in the rotor; however, there are only 20 poles. In addition, the first stator tooth 26 and last stator tooth 26' of the stator 28 are configured to allow for the entry of the coil without the loss of a tooth and useful pole, in a coil entry end 62 configuration. This configuration increases the power and efficiency of the motor.

Figure 14:
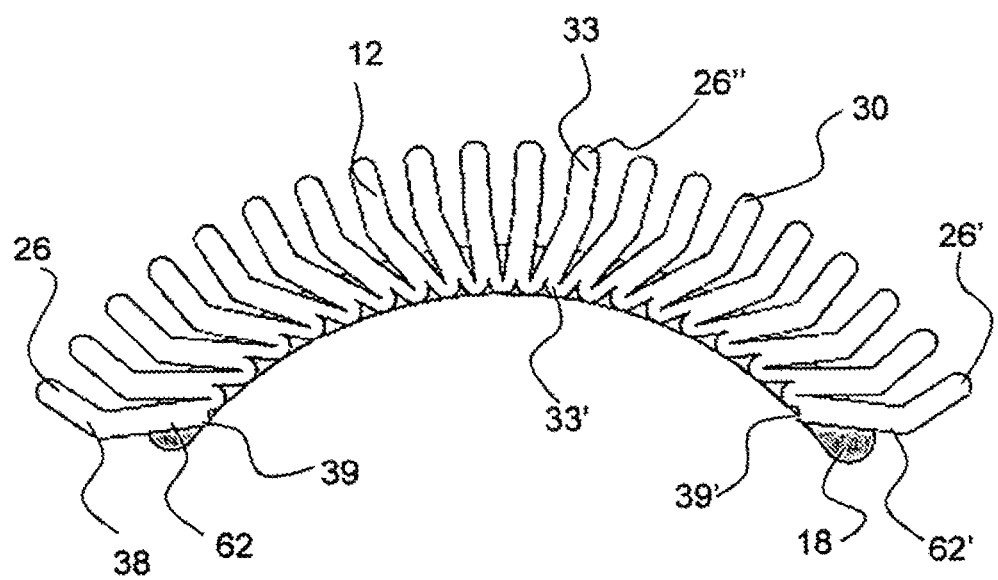
FIG. 14 shows a side view of an exemplary stator half consisting of formed tape, and a return and showing angled teeth to allow for coil and wire exit without reducing flux area.

As shown in FIG. 14, an exemplary stator half consists of formed tape 30. The tape comprises a plurality of folds 33, 33'. Fold 33 is an inside fold, where the inside surfaces of the tape are folded together or towards each other. Fold 33' is an outside fold, where the outside surfaces of the tape are folded together or towards each other. A stator may comprise any number of inside and outside folds, and each fold may have any suitable fold angle Fa, as described herein. A tape with substantially a 180 degree fold angle is folded back upon itself such that the tape on one side of the fold is substantially aligned with the tape on the other side of the fold. Also shown in FIG. 14 are the tape ends 39 and 39'. The tape ends are not located in an area that would cause any flux flow disturbance or loss. FIG. 14 shows the inner portion of the teeth angling into the return such that the space requirements for the coil (not shown) have clearance without losing a tooth and reducing flux area.

Figure 15:
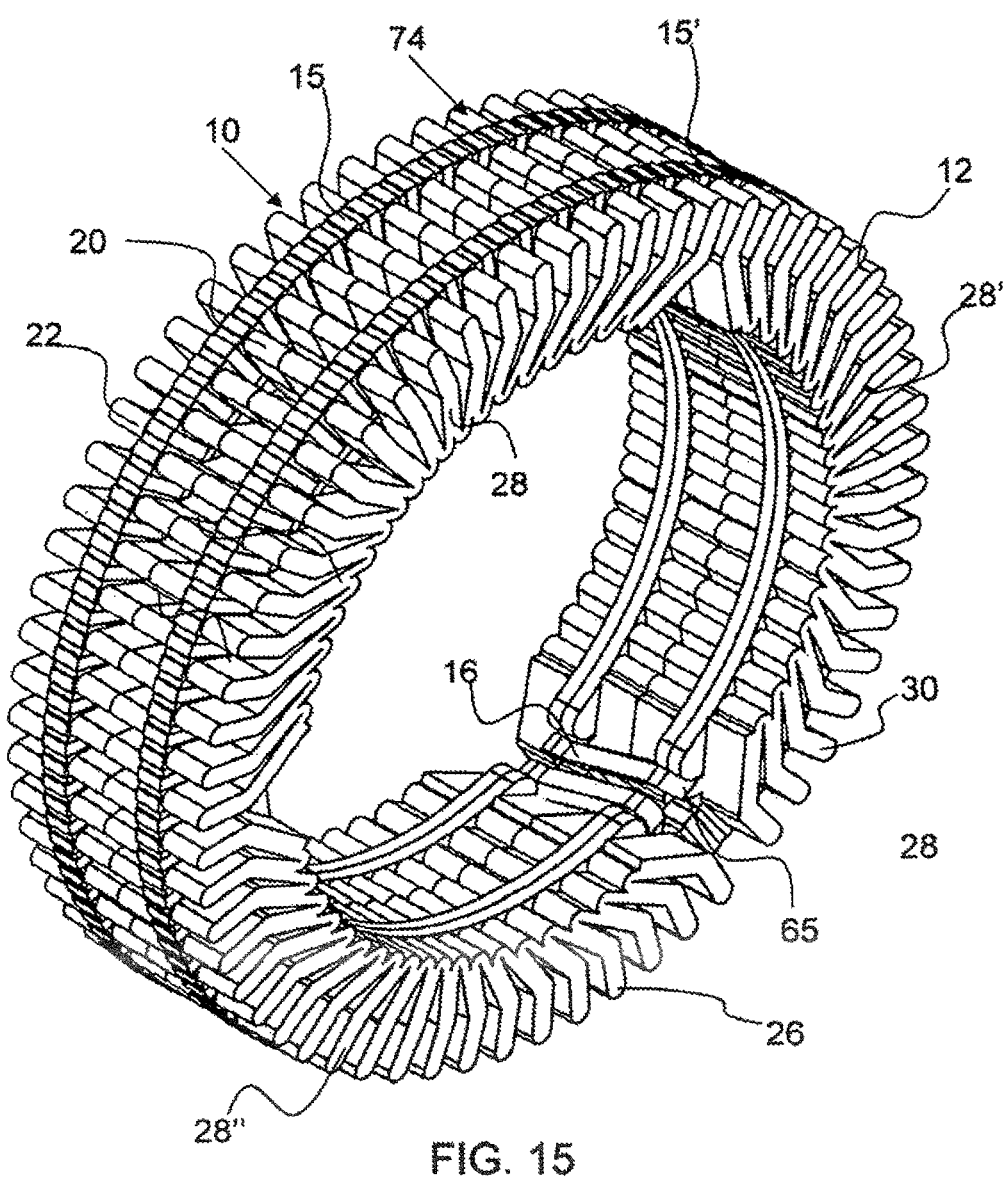
FIG. 15 shows an isometric view of a portion of an exemplary double in-plane three-phase transverse flux motor having tape stator halves configured on either side of a rotor for two rotors.

As shown in FIG. 15, a portion of an exemplary double in-plane three-phase 74 transverse flux motor 10 comprises stator halves of formed tape configured on either side of two rotors 15, 15'. The coil 16 extends along each stator and has a coil end turn 65, whereby the coil is electrically coupled with a coil extending along the adjacent stator. Very high utilization of the coil is achieved with this design with only the coil connector not being effectively engaged in power generation.

Figure 16:
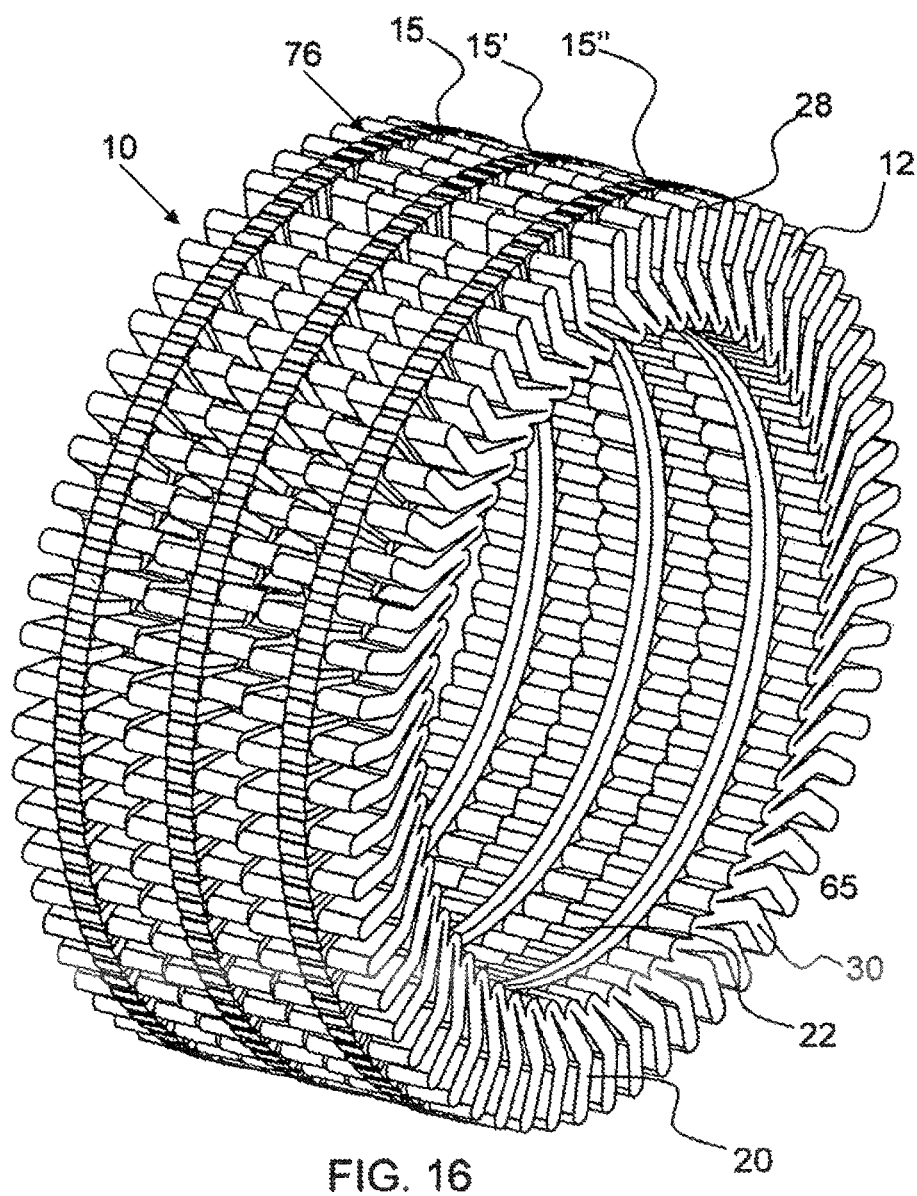
FIG. 16 shows an isometric view of a portion of an exemplary axially stacked three-phase transverse flux motor having tape stator halves configured on either side of a rotor for three rotors.

As shown in FIG. 16, a portion of an exemplary axially-stacked three-phase transverse flux motor 76 having tape stator halves configured on either side of three rotors 15-15". The stator halves 20, 22 extend substantially around the entire rotor 15, as shown in FIG. 16.

Figure 17:
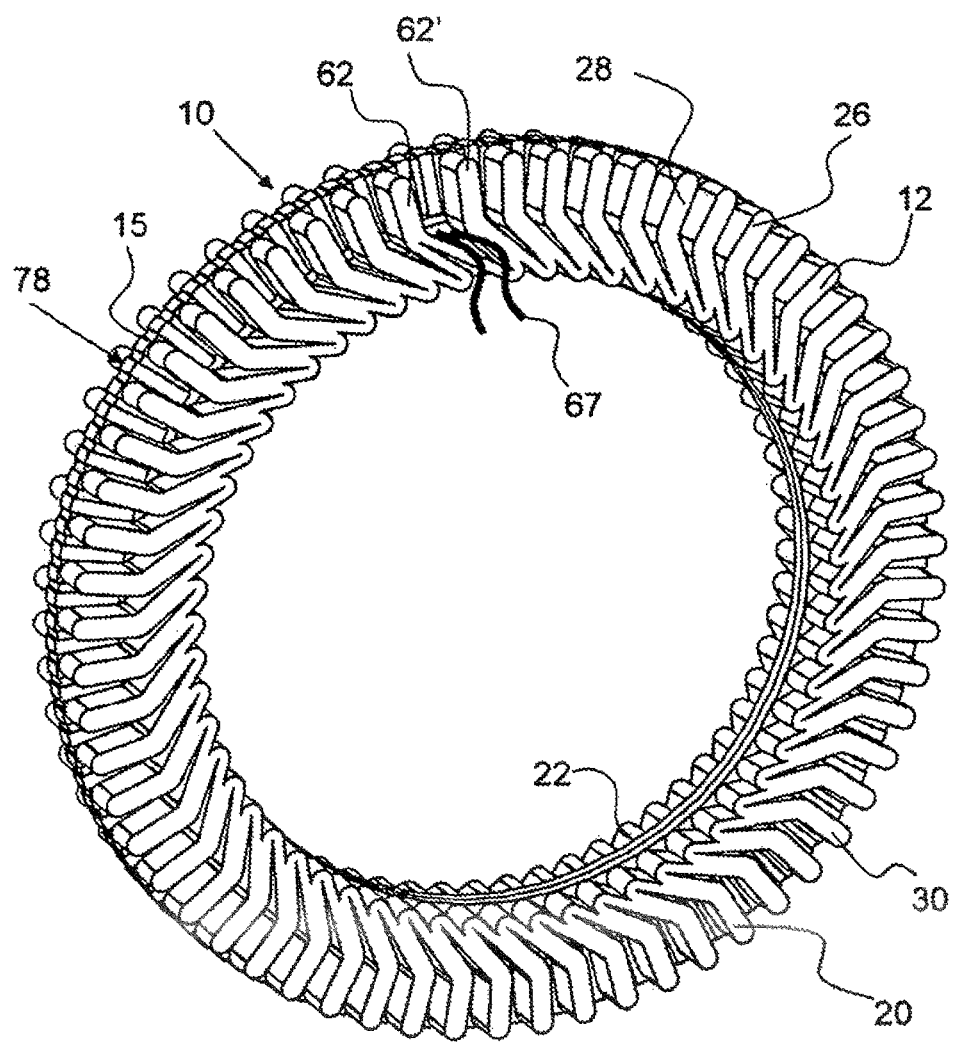
FIG. 17 shows an isometric view of a portion of an exemplary single phase transverse flux motor having a tape stator half configured on either side of a rotor.

FIG. 17 shows an isometric view of a portion of an exemplary single-phase transverse flux motor 78 having a tape 30 stator 28 configured on either side of its rotor. A first stator half 20 and second stator half 22 extend substantially all the way around the rotor 15. The stator halves comprise coil entry ends 62, 62', whereby the coil contacts may extend away from the coil and outside of the stator 28. This stator is configured as an asymmetric stator 60 whereby the stator teeth 26 are exemplarily aligned for 121 poles and there are only 120 poles.

Figure 18:
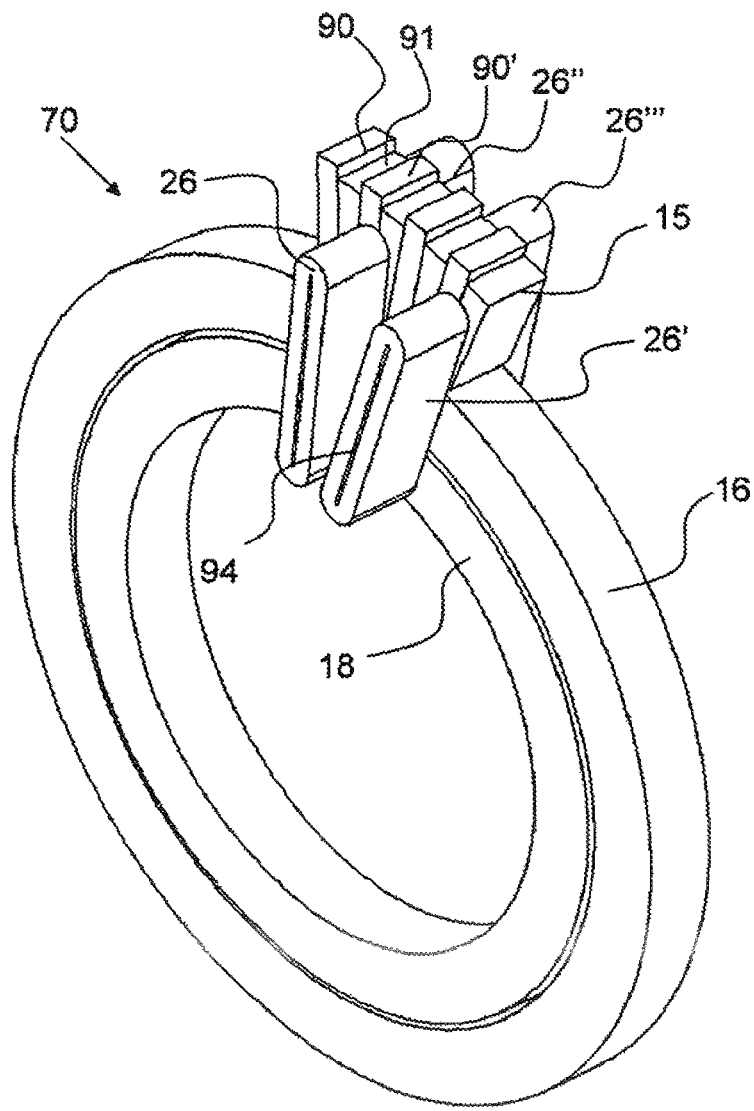
FIG. 18 shows an isometric view of a portion of an exemplary single phase transverse flux motor having discrete teeth on either side of the stator.

As shown in FIG. 18, an axial transverse flux motor 70 comprises a plurality of discrete stator teeth 26-26', also referred to as poles, configured on either side of the rotor 15. The discrete stator teeth are flattened tape wound toroids that are made out of separate pieces of material from each other. Each discrete stator tooth comprises a gap 94, which reduces the tendency of flux to pass through the planes of the tape, which would cause additional loss. The return 18 provides mechanical support and transfers flux from a first tooth on a first side of the rotor to a second tooth on a second side of the rotor. The rotor 15 comprises magnets 90, 90' and flux concentrators 91 disposed between magnets. The magnets extend further radially than the flux concentrators 91, as shown. In an exemplary embodiment, the magnets 90 extend further inward, further toward the center of the motor, than the flux concentrators 91. Only a portion of the stator, two teeth per side, is shown in FIG. 18 to allow a more clear depiction of the components.

Figure 19:
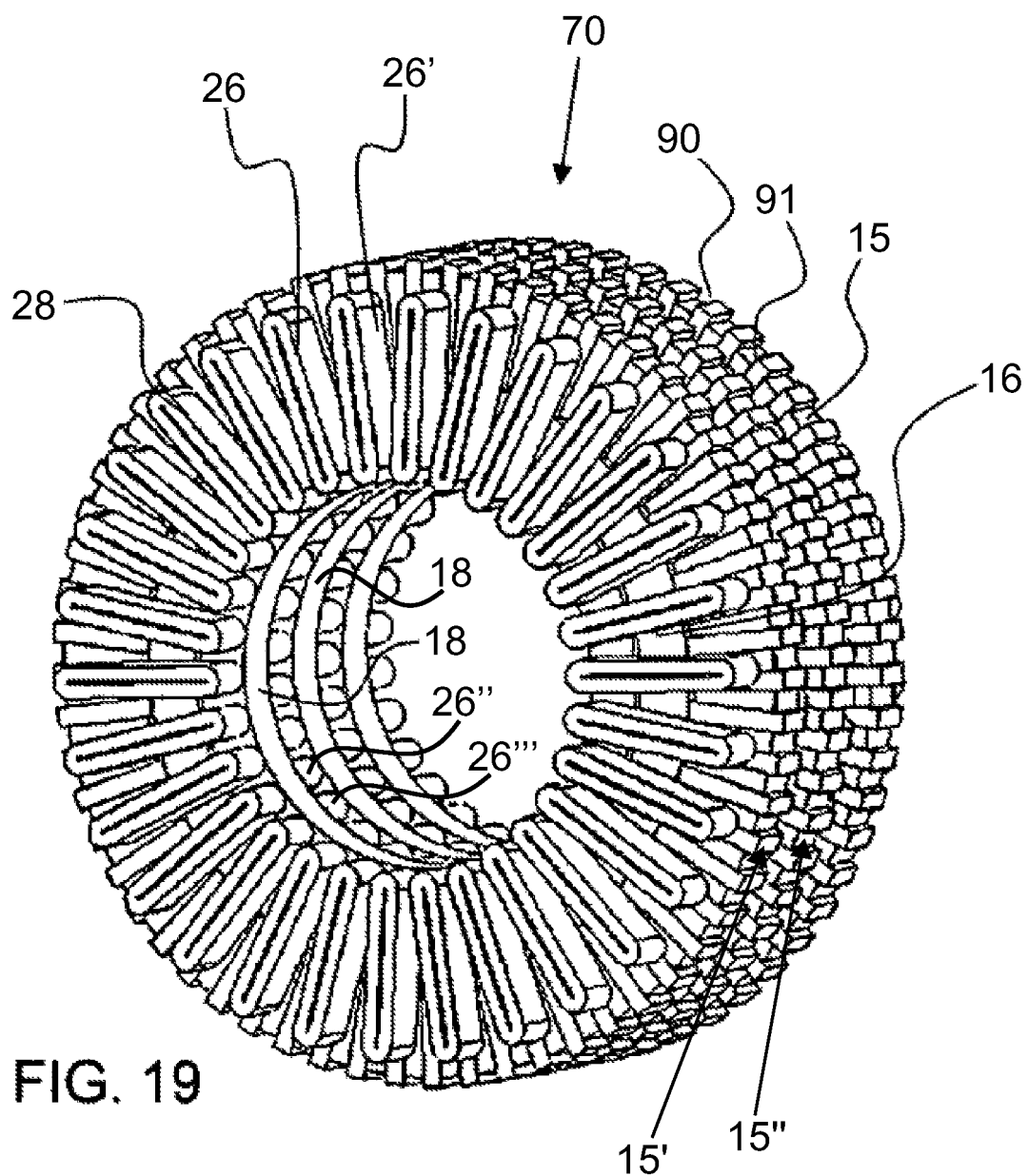
FIG. 19 shows an isometric view of an exemplary three-phase axial transverse flux motor having discrete stator teeth and flux sharing between phases.

As shown in FIG. 19, a multiphase arrangement where flux is shared rather than having discrete phases axially as shown in FIG. 16. Each stator stack 28 comprises 30 discrete stator teeth 26 configured radially. Each tooth, or pole, is made of a flattened tape wound toroid. The teeth are positioned around the toroid return. The return shown is a toroid of wound tape. The axial transverse flux motor 70 comprises three phases with one rotor per phase. Only four stator stacks make up the three-phase assembly. Each phase only requires one additional stator stack, whereas prior requires two stator stacks generally spaced apart per phase. Therefore, this motor design provides for better efficiency, smaller size and lower weight for a given output. Each rotor 15 comprises a magnet 90 and flux concentrator 91.

Figure 20:
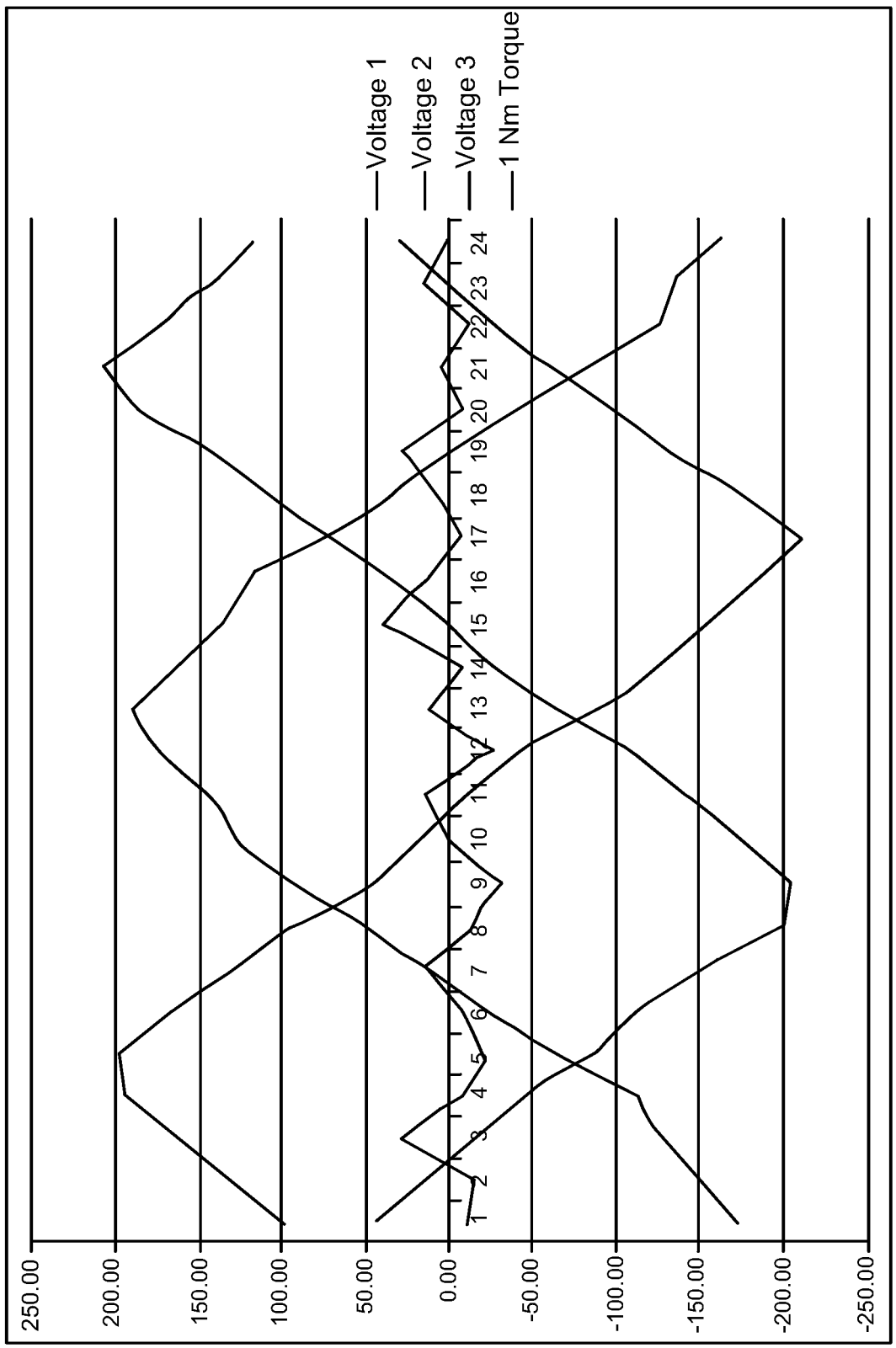
FIG. 20 shows a graph of the resulting electrical output from the motor shown in FIG. 19.

FIG. 20 shows the electrical output from the three phases of the motor shown in 19. It can be seen that, although there are some differences from phase to phase, they can be essentially the same as three discrete and spaced single phased motors, as shown in FIG. 16.

Figure 21:
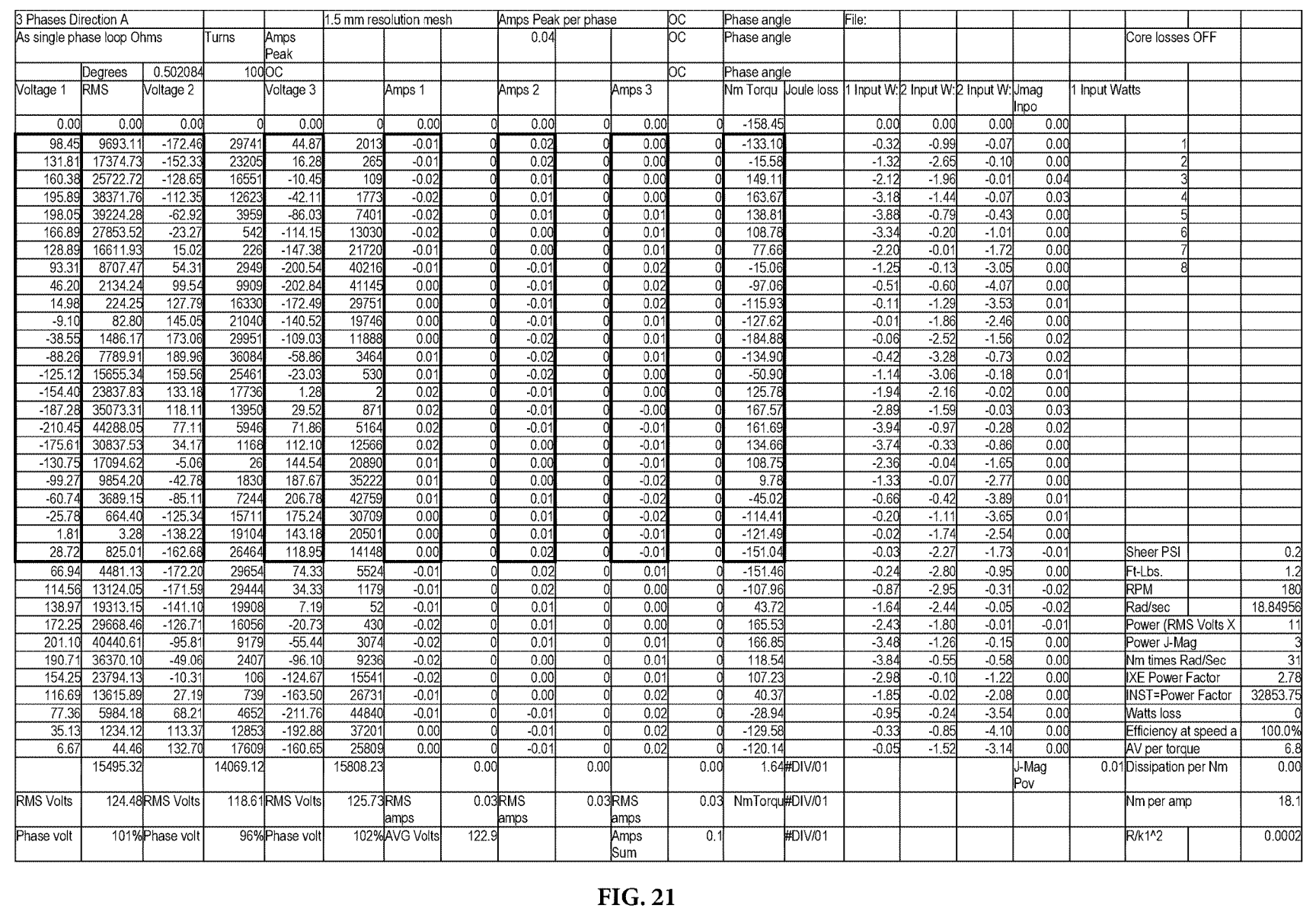

FIG. 21 shows the data used to produce the graph shown in FIG. 20. An approximately +/−2% variation in voltage between phases occurs. Small refinements may be required for some applications. The variations shown may also be remnants of modeling inaccuracy, such as those caused by meshing choices.

Definitions

Tape, as used herein, is defined as a plurality of slit magnetically conducting ribbons configured one on top of another. A tape may be a tape loop wherein it is essentially continuous, or discrete having a length between a first and a second end. A tape or ribbon may have any suitable thickness.

Magnetically couple, as used herein, means that magnetic flux can flow from one material to another. A material that magnetically couples a first article to a second article conducts magnetic flux from the first article and to the second article.

Teeth or a tooth, as used herein, is a pole when configured in an electric motor or generator.

A stator, as used herein, may be fixed, pivot or rotate or move.

An armature, as used herein, may be fixed, pivot or rotate or move.

A rotor, as used herein, may be fixed, pivot or rotate or move.

A pole or pole piece as used herein refers to a stator tooth.

It will be apparent to those skilled in the art that various modifications, combinations and variations can be made in the present invention without departing from the spirit or scope of the invention. Specific embodiments, features and elements described herein may be modified and/or combined in any suitable manner. Thus, it is intended that the present invention cover the modifications, combinations and variations of this invention, provided they come within the scope of the appended claims and their equivalents.

What is claimed is:

1. An electric motor comprising:
  a stator comprising a plurality of stator teeth;
  a first rotor;
  a second rotor;
  the first rotor and the stator operatively configured to rotate relative to each other about a motor axis;
  the second rotor and the stator operatively configured to rotate relative to each other about the motor axis;
  the plurality of stator teeth positioned between the first rotor and the second rotor;
  a first gap between the first rotor and the plurality of stator teeth;
  a second gap between the second rotor and the plurality of stator teeth;
  the plurality of stator teeth comprising folded tape;
  the folded tape comprising a plurality of ribbon layers of magnetic flux conducting material having a width between a first edge and a second edge;
  the folded tape comprising a rotor fold and a return fold;
  the first edge of the folded tape at the rotor fold aligned adjacent the first rotor and the second edge of the folded tape at the rotor fold aligned adjacent the second rotor; and
  the motor operationally configured to conduct a magnetic flux from the first rotor across the first gap into the first edge of the folded tape at the rotor fold and to conduct a magnetic flux from the second rotor across the second gap into the second edge of the folded tape at the rotor fold.

2. The electric motor of claim 1, wherein the plurality of stator teeth comprise discrete stator teeth comprising discrete folded tape portions.

3. The electric motor of claim 2, wherein each of the discrete folded tape portions comprises a gap within the respective discrete folded tape portions.

4. The electric motor of claim 2, wherein each of the discrete folded tape portions comprises a flattened tape wound toroid.

5. The electric motor of claim 1, wherein the folded tape comprises a continuous loop.

6. The electric motor of claim 5, wherein the plurality of stator teeth comprise two or more contiguous stator teeth, and the two or more contiguous stator teeth comprise a continuous loop of the folded tape.

7. The electric motor of claim 1, wherein the folded tape comprises a spacer between a first layer of the plurality of ribbon layers and a second layer of the plurality of ribbon layers.

8. The electric motor of claim 1, wherein the first gap is an axial gap between the first rotor and the plurality of stator teeth, and the width is an axial width between the first edge and the second edge of the plurality of ribbon layers.

9. The electric motor of claim 1, comprising a first magnetic flux return and wherein the motor is operationally configured to conduct the magnetic flux out of the first edge of the folded tape into the first magnetic flux return at the return fold.

10. The electric motor of claim 9, wherein the first magnetic flux return is concentric to the first rotor.

11. The electric motor of claim 10, wherein the first magnetic flux return comprises a plurality of ribbon layers of magnetic flux conducting material having an axial width between a first return edge and a second return edge.

12. The electric motor of claim 9, comprising a coil configured around the first magnetic flux return.

13. The electric motor of claim 1, wherein the folded tape comprises at least 200 ribbon layers, a thickness of at least 5 mm, and a width of no more than 3 cm.

14. The electric motor of claim 1, wherein each of the ribbon layers has a thickness of no more than 25 um.

15. The electric motor of claim 1, wherein the plurality of stator teeth comprises at least 180 stator teeth.

16. The electric motor of claim 1, wherein the plurality of stator teeth are positioned axially between the first rotor and the second rotor.

17. The electric motor of claim 1, wherein the tape comprises an amorphous metal alloy or a nanocrystalline material.

\* \* \* \* \*